US012669435B2

(12) United States Patent
Zhang

(10) Patent No.: US 12,669,435 B2
(45) Date of Patent: Jun. 30, 2026

(54) APPARATUS AND METHOD FOR SUPER-RESOLUTION BRILLOUIN MICROSCOPY

(71) Applicant: WAYNE STATE UNIVERSITY, Detroit, MI (US)

(72) Inventor: Jitao Zhang, Troy, MI (US)

(73) Assignee: Wayne State University, Detroit, MI (US)

( * ) Notice: Subject to any disclaimer, the term of this patent is extended or adjusted under 35 U.S.C. 154(b) by 264 days.

(21) Appl. No.: 18/406,453

(22) Filed: Jan. 8, 2024

(65) Prior Publication Data

US 2024/0230532 A1 Jul. 11, 2024

Related U.S. Application Data

(60) Provisional application No. 63/440,229, filed on Jan. 20, 2023, provisional application No. 63/437,632, filed on Jan. 6, 2023.

(51) Int. Cl.
*G01N 21/63* (2006.01)
*G02B 21/00* (2006.01)

(52) U.S. Cl.
CPC ....... *G01N 21/636* (2013.01); *G02B 21/0032* (2013.01); *G02B 21/008* (2013.01); *G01N 2021/638* (2013.01)

(58) Field of Classification Search
None
See application file for complete search history.

(56) References Cited

U.S. PATENT DOCUMENTS

| | | | |
|---|---|---|---|
| 5,706,094 A * | 1/1998 | Maris | G01N 21/1717 356/432 |
| 11,408,770 B2 * | 8/2022 | Scarcelli | G02B 21/0096 |
| 12,019,018 B2 * | 6/2024 | Scarcelli | G01N 21/636 |
| 2003/0234933 A1 * | 12/2003 | Nicolaides | G01N 21/1717 356/432 |
| 2015/0222085 A1 | 8/2015 | Keaton et al. | |
| 2016/0109736 A1 | 4/2016 | Bahl et al. | |
| 2017/0254749 A1 | 9/2017 | Yun | |
| 2022/0042908 A1 | 2/2022 | Scarcelli et al. | |

OTHER PUBLICATIONS

Int'l Search Report & Written Opinion dtd Apr. 16, 2024 for PCT Appn. PCT/US2024/10653, 9 pgs.

* cited by examiner

*Primary Examiner* — Dung T Nguyen
(74) *Attorney, Agent, or Firm* — Brooks Kushman P.C.

(57) ABSTRACT

An apparatus for super-resolution Brillouin microscopy includes a probe laser that emits a first laser beam and a first objective lens that focuses the first laser beam onto a sample. The apparatus further includes a pump laser that emits a second laser beam and a second quarter-wave plate that receives the second laser beam. The apparatus further includes a depletion laser that emits a third laser beam that passes through a phase plate to modify its wavefront phase such that the third laser beam has a donut shape, and a second objective lens that focuses the second laser beam and the third laser beam onto the sample. Characteristically, the beam spot from the depletion laser is overlaid with the Gaussian-shape beam spots of the first laser beam and the second laser beam at the same focal plane. A detector is configured to detect a stimulated Brillouin gain signal and a stimulated Brillouin loss signal.

15 Claims, 6 Drawing Sheets

APPARATUS AND METHOD FOR SUPER-RESOLUTION BRILLOUIN MICROSCOPY

CROSS-REFERENCE TO RELATED APPLICATIONS

This application claims the benefit of U.S. provisional application Ser. No. 63/440,229 filed Jan. 20, 2023, and U.S. provisional application Ser. No. 63/437,632 filed Jan. 6, 2023, the disclosures of which are hereby incorporated in their entirety by reference herein.

TECHNICAL FIELD

The present disclosure relates to the improvements to Brillouin microscopy techniques. Specifically, the present disclosure relates to the development of the apparatus and method of super-resolution Brillouin microscopy. The invented apparatus and method break the optical diffraction limit and can achieve a spatial resolution that is 5 times better than existing Brillouin techniques, which allows to quantify the mechanical properties of biomedical material at ~100 nm scale.

BACKGROUND

Cells experience physical changes of microenvironments during many physiological and pathological activities including cancer metastasis, immune response, and development. To adapt to such changes, cells use cytoskeleton and nucleus to sense and respond to the external stimuli via subcellular structures including focal adhesion and microfilament proteins[1,2]. For example, the stress fibers, bundles of actomyosin filaments, is a crucial cytoskeletal component to regulate cell's functions including adhesion, contraction, migration, differentiation, and maintaining its shape[3]. To understand the complex mechanical interactions, it is fundamentally necessary to quantify the mechanical elasticity of these subcellular cytoskeletal components in situ. However, this is highly challenging due to the inherent limitation of existing techniques.

Cytoskeletal structure such as stress fibers has size of hundreds of nanometers and mechanically connected with other components within the cell body. Existing methods for measuring mechanical property of cell can be classified into two categories: contact-based and noncontact-based. Contact-based techniques such as atomic force microscopy (AFM) or micropipette stretching requires physical contact and applies force to cell body[4,5], making it an indirect probe and impossible to assess the intracellular structure exclusively due to the mechanical interaction of cytoskeletal components[6]. On the other hand, noncontact-based technique such as optical elastography[7] and confocal Brillouin microscopy[8] do not have enough spatial resolution to differentiate the microfilament structures. Therefore, A technique that can directly quantify the mechanical property of microfilament structures inside the cell with high resolution in 2D/3D is highly desired but an unmet need.

In recent years, confocal Brillouin microscopy has been emerged as a promising complementary tool to conventional technologies for quantifying the mechanical properties of biomedical materials, as it is an all-optical technique and can conduct the measurement in a noncontact, non-perturbative, and label-free manner[9-24]. However, current Brillouin microscopy is based on the spontaneous Brillouin scattering and optical confocal configuration. As such, its spatial resolution is limited to approximately half of the wavelength (~500 nm), which is not enough to identify cytoskeletal structures. Therefore, there exists a general need for developing new apparatus and method of Brillouin microscopy that can significantly improve the spatial resolution of Brillouin technology so that the mechanical properties of the intracellular structure that has nanometer size can be measured.

SUMMARY

In at least one aspect, an apparatus and method of super-resolution Brillouin microscopy (SBM) that overcomes the aforementioned limitations is provided. The innovation of the proposed SBM is based on the physical principle of stimulated Brillouin scattering[25,26] and the idea of stimulated emission depletion[27]. Different from the spontaneous scattering used in confocal Brillouin, stimulated Brillouin scattering is a highly controllable scattering process: Brillouin signal (gain or loss) is only excited when the frequency difference between a pump laser and a probe laser matches the Brillouin frequency shift of the material[26]. To achieve super-resolution, we first build up the stimulated Brillouin scattering with a pump laser and a probe laser, both beams have Gaussian-profile intensity shape. We then introduce a third laser (depletion laser) that has a donut shape and make it overlap with the Gaussian beam. By tuning the frequencies of three lasers, we can deplete Brillouin gain within the overlapping region, thus the detected Brillouin signal will be only from the subtracted region, whose size is much smaller than the original diffraction-limited Gaussian beam.

In another aspect, an apparatus for super-resolution Brillouin microscopy is provided. The apparatus includes a probe laser that emits a first laser beam, a polarizer through which the first laser beam passes, a first quarter-wave plate through which the first laser beam passes after the polarizer, and a first objective lens that focuses the first laser beam onto a sample. Characteristically, the first laser beam has a beam spot with a diffraction-limited Gaussian intensity profile. The apparatus further includes a pump laser that emits a second laser beam, a second quarter-wave plate that receives the second laser beam. The apparatus further includes a depletion laser that emits a third laser beam, a phase plate through which the third laser beam passes to modify its wavefront phase such that the third laser beam has a donut shape, and a second objective lens that focuses the second laser beam and the third laser beam onto the sample. Characteristically, the beam spot from the depletion laser is overlaid with the Gaussian-shape beam spots of the first laser beam and the second laser beam. The apparatus also includes a detector configured to detect a stimulated Brillouin gain (SBG) signal and a stimulated Brillouin loss (SBL) signal. Advantageously, the apparatus is configured to adjust the frequencies of the probe laser, the pump laser, and the depletion laser to establish stimulated emission depletion such that the Brillouin signal created from the subtracted region of the Gaussian beam and donut beam is collected by the second objective lens and redirected into the detector.

In another aspect, a method for establishing stimulated emission depletion with the apparatus described herein is provided. The method includes steps of:

moving the phase plate out of the beam path so that the beam spot of the depletion laser has a Gaussian intensity shape and is overlapped with the beam spots of the pump laser as well as the probe laser at the focal plane of the objective lens;

locking the frequency of the pump laser to the absorption line of the Rubidium (Rb) gas. scanning the frequency of the probe laser until the detector detects the stimulated Brillouin gain (SBG) signal;

blocking the pump laser beam, and scanning the frequency of the depletion laser until the detector detects the stimulated Brillouin loss (SBL) signal;

re-switching on the pump laser beam, and adjusting the power of the depletion laser until the SBG signal and SBL signal cancel out with each other; and inserting the phase plate into the beam path to reshape the beam spot of the depletion laser into a donut shape at the focal plane of the objective lens.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a further understanding of the nature, objects, and advantages of the present disclosure, reference should be made to the following detailed description, read in conjunction with the following drawings, wherein like reference numerals denote like elements and wherein.

DETAILED DESCRIPTION

Figure 1:
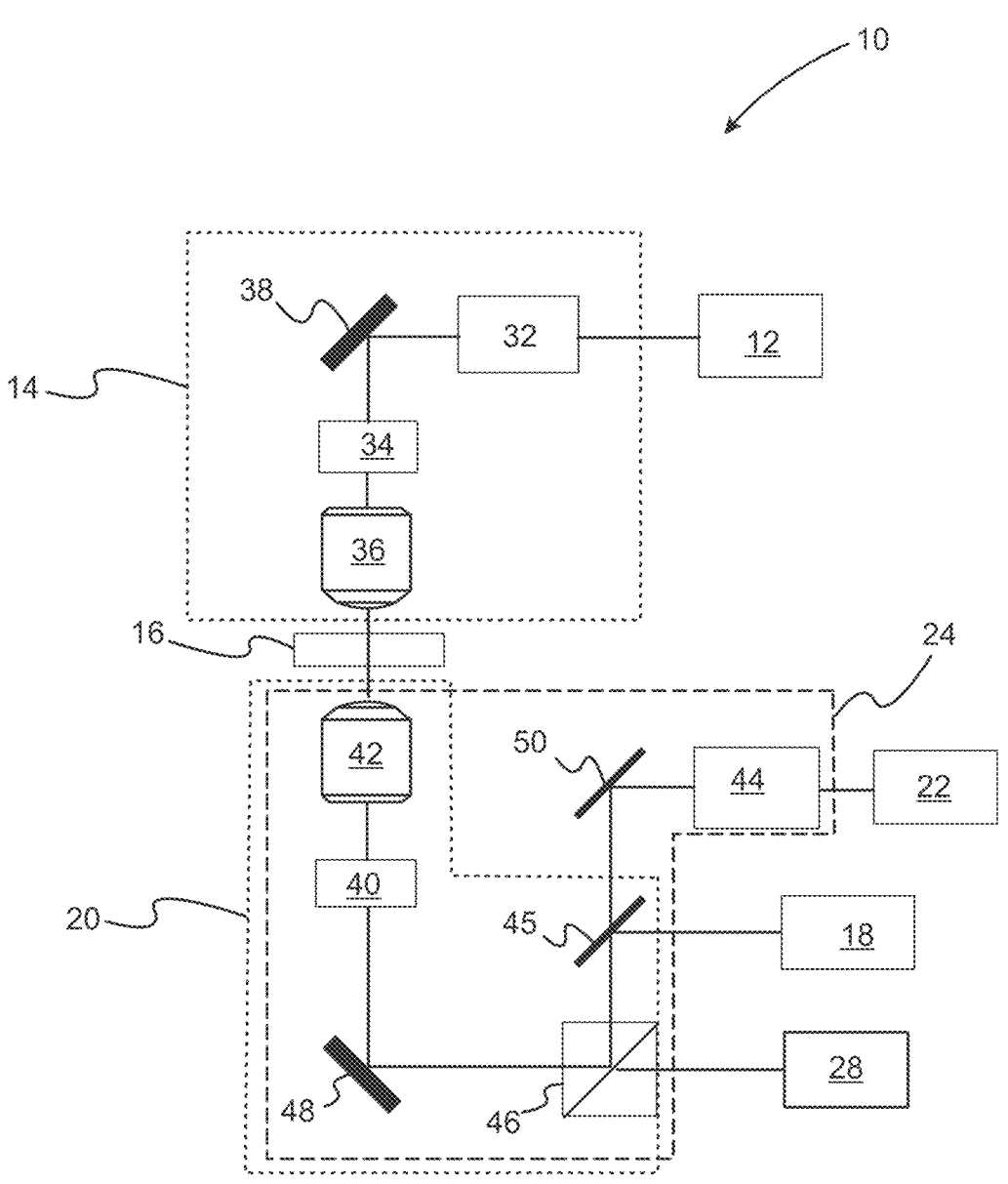
FIG. 1 illustrates the first exemplary embodiment of this invention. It shows the schematic configuration of the super-resolution Brillouin microscopy.

Reference will now be made in detail to presently preferred embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

When referring to a numerical quantity, in a refinement, the term "less than" includes a lower non-included limit that is 5 percent of the number indicated after "less than." A lower non-includes limit means that the numerical quantity being described is greater than the value indicated as a lower non-included limited. For example, "less than 20" includes a lower non-included limit of 1 in a refinement. Therefore, this refinement of "less than 20" includes a range between 1 and 20. In another refinement, the term "less than" includes a lower non-included limit that is, in increasing order of preference, 20 percent, 10 percent, 5 percent, 1 percent, or 0 percent of the number indicated after "less than."

With respect to electrical devices, the term "connected to" means that the electrical components referred to as connected to are in electrical communication. In a refinement, "connected to" means that the electrical components referred to as connected to are directly wired to each other. In another refinement, "connected to" means that the electrical components communicate wirelessly or by a combination of wired and wirelessly connected components. In another refinement, "connected to" means that one or more additional electrical components are interposed between the electrical components referred to as connected to with an electrical signal from an originating component being processed (e.g., filtered, amplified, modulated, rectified, attenuated, summed, subtracted, etc.) before being received to the component connected thereto.

The term "electrical communication" means that an electrical signal is either directly or indirectly sent from an originating electronic device to a receiving electrical device. Indirect electrical communication can involve processing of the electrical signal, including but not limited to, filtering of the signal, amplification of the signal, rectification of the signal, modulation of the signal, attenuation of the signal, adding of the signal with another signal, subtracting the signal from another signal, subtracting another signal from the signal, and the like. Electrical communication can be accomplished with wired components, wirelessly connected components, or a combination thereof.

The term "one or more" means "at least one" and the term "at least one" means "one or more." The terms "one or more" and "at least one" include "plurality" as a subset.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

The term "electrical signal" refers to the electrical output from an electronic device or the electrical input to an electronic device. The electrical signal is characterized by voltage and/or current. The electrical signal can be stationary with respect to time (e.g., a DC signal) or it can vary with respect to time. The term "computing device" refers generally to any device that can perform at least one function, including communicating with another computing device. In a refinement, a computing device includes a central processing unit that can execute program steps and memory for storing data and a program code.

When a computing device is described as performing an action or method step, it is understood that the one or more computing devices are operable to perform the action or method step typically by executing one or more lines of source code. The actions or method steps can be encoded onto non-transitory memory (e.g., hard drives, optical drive, flash drives, and the like).

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Throughout this application, where publications are referenced, the disclosures of these publications in their entireties are hereby incorporated by reference into this application to more fully describe the state of the art to which this invention pertains.

Abbreviations

"PBS" means polarized beam splitter.
"Rb" means Rubidium.
"SBG" means stimulated Brillouin gain.
"SBL" means stimulated Brillouin loss.

This invention is based on the principle of stimulated Brillouin scattering and the idea of stimulated emission depletion. The stimulated Brillouin scattering is a nonlinear optical process where the acoustic phonons are driven by the resonant interaction of counter-propagating pump and probe lasers. This is a controllable process as the Brillouin signal (stimulated Brillouin gain or stimulated Brillouin loss) will be excited only when the frequency difference of the pump laser and the probe laser matches the Brillouin shift of the material. The idea of stimulated emission depletion has enabled the breakthrough of fluorescence super-resolution microscopy, where the resolution below diffraction limit is achieved by selectively deactivating fluorophores. In this invention, we adapt the idea of stimulated emission to the scenario of stimulated Brillouin scattering and achieve super-resolution in biomechanical imaging.

FIG. 1 shows the first exemplary embodiment of an apparatus for super-resolution Brillouin microscopy. Apparatus 10 includes probe laser 12 that emits a first laser beam. A first optical system 14 focuses the first laser beam into a first Gaussian-shaped beam spot on a sample 16 at a first focal plane that has a first Gaussian intensity profile. Pump laser 18 emits a second laser beam. A second optical system 20 focuses the second laser beam into a second Gaussian-shaped beam spot on the sample at a second focal plane that has a second Gaussian intensity profile. Characteristically, the second focal plane overlaps the first focal plane. The first Gaussian-shaped beam spot overlaps the second Gaussian-shaped beam spot. A depletion laser 22 emits a third laser beam. A third optical system 24 focuses the third laser beam into a third beam spot having a donut shape with zero intensity in its center. The third beam spot is overlaid with the first Gaussian-shaped beam spot and the second Gaussian-shaped beam spot. A detector 28 is configured to detect a stimulated Brillouin gain (SBG) signal and a stimulated Brillouin loss (SBL) signal. Advantageously, the apparatus is configured to adjust frequencies of the probe laser, the pump laser, and the depletion laser to establish stimulated emission depletion such that a Brillouin signal created from a subtracted region of the first Gaussian-shaped beam spot and the second Gaussian-shaped beam spot and donut beam is collected and redirected into the detector.

In another aspect the first optical system 14 includes a polarizer 32 through which the first laser beam passes and a first quarter-wave plate 34 through which the first laser beam passes after the polarizer. First optical system 14 also includes a first objective lens 36 that focuses the first laser beam onto the sample, wherein the first laser beam has a beam spot with a diffraction-limited Gaussian intensity profile. In a refinement, the first optical system 14 also includes a mirror 38. The first laser beam is reflected by mirror 38 from the polarizer 32 to the first quarter-wave plate 34.

In another aspect, the second optical system 20 includes a second quarter-wave plate 40 that receives the second laser beam. Second optical system 20 also includes second objective lens 42 that focuses the second laser beam onto the sample. In a refinement, second optical system 20 also includes beam splitter 45, a polarized beam splitter 46, and a mirror 48. The second laser beam emitted from the pump laser is redirected into the second quarter-wave plate 40 by a beam splitter 45, a polarized beam splitter 46, and mirror 48.

In another aspect, the third optical system 24 includes a phase plate 44 through which the third laser beam passes to modify its wavefront phase such that the third laser beam has the donut shape. Third optical system 24 also includes the second objective lens 42 that also focuses the third laser beam onto the sample 16. Third optical system 24 also includes mirror 50, second quarter-wave plate 40, beam splitter 45, a polarized beam splitter 46, and a mirror 48. The third laser beam is guided from the phase plate 44 into the second objective lens and focused into the sample after passing through a mirror 50, a beam splitter 45, a polarized beam splitter 46, the mirror 48, and the second quarter-wave plate 40.

In another aspect, the first objective lens 36 and the second objective lens 42 have the same configuration.

Referring more specifically to FIG. 1, the first laser beam emitted by probe laser 12 first passes through a polarizer 32. After reflected by a mirror 38, the beam passes through a quarter-wave plate 34 and is focused into the sample 16 by an objective lens 36. At the focal plane, the beam spot has a diffraction-limited Gaussian intensity profile. The second laser beam emitted from the pump laser 18 is redirected into a quarter-wave plate 40 by a beam splitter 45, a polarized beam splitter 46, and a mirror 48. After that, the second laser beam is focused into the sample 16 by an objective lens 42 that is identical to the objective lens 36. The objective lenses 36 and 42 are adjusted such that their focal planes are overlapped within the sample 16. Therefore, the beam spots of the first laser beam and the second laser beam are perfectly overlapped within the sample 16 and have Gaussian intensity profile. The third laser beam emitted from a depletion laser 22 first passes through a phase plate 44 to modify its wavefront phase. The laser beam is then guided into the objective lens 42 and focused into the sample 16 after passing through the mirror 50, the beam splitter 45, the polarized beam splitter 46, the mirror 48 and the quarter-wave plate 40. The beam spot from the depletion laser 22 is overlaid with the Gaussian-shape beam spots of the probe laser 12 and the pump laser 18. Because of the phase plate 44, the beam spot from the depletion laser 22 has donut shape featuring a zero intensity in the center. By adjusting the frequencies of the lasers 12, 18, and 22, the stimulated emission depletion is established such that the Brillouin signal created from the subtracted region of the Gaussian beam and donut beam is collected by the objective lens 42 and redirected into the detector 28 by the quarter-wave plate 40, the mirror 48, and the polarized beam splitter 46. Since the subtracted region is much smaller than the diffraction-limited Gaussian beam, super-resolution Brillouin detection is achieved.

Figure 2:
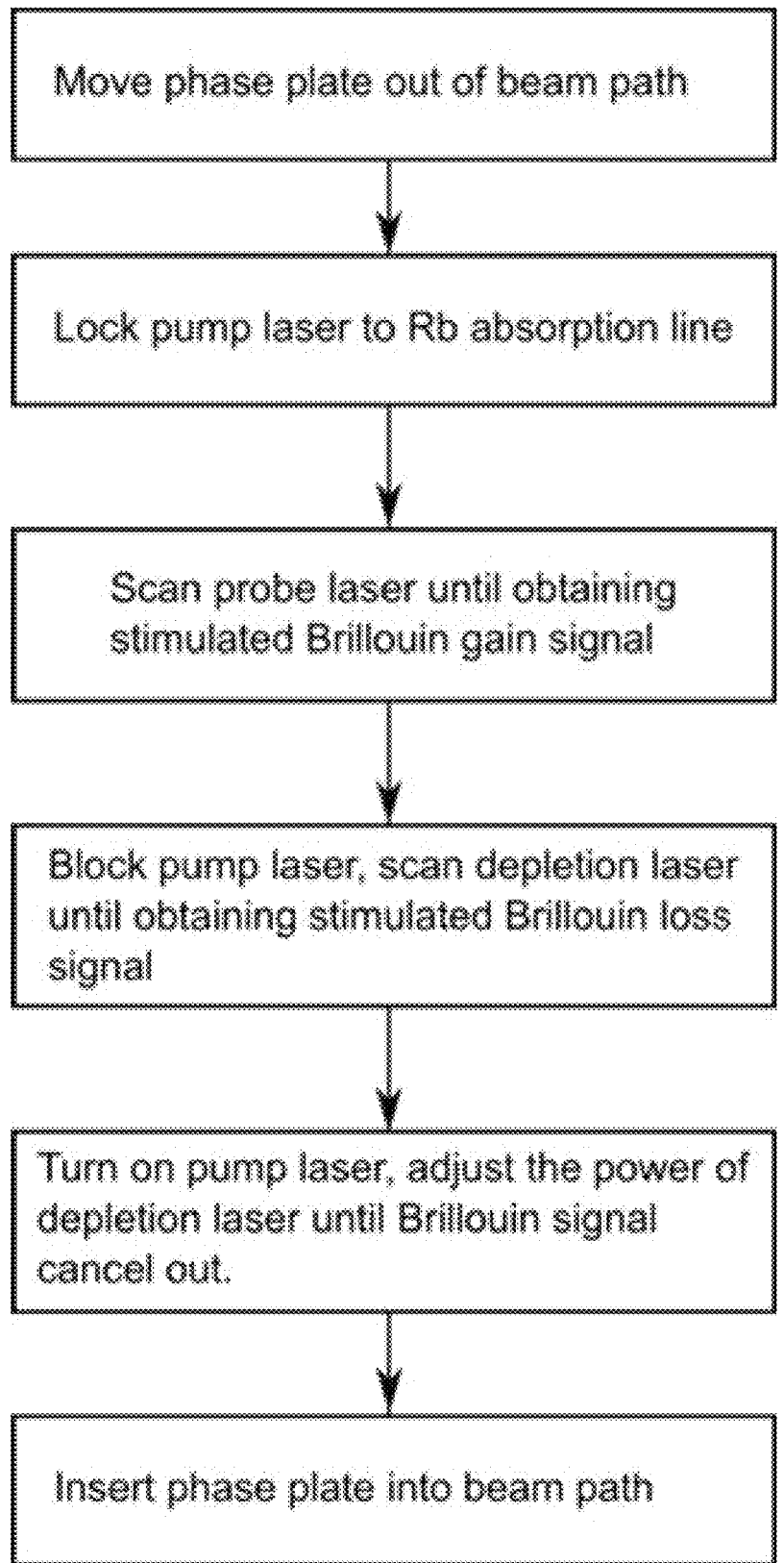
FIG. 2 illustrates the second exemplary embodiment of this invention. It provides a flowchart of exemplary steps to establish the stimulated emission depletion.

FIG. 2 provides a flowchart of exemplary steps to establish the stimulated emission depletion with the setup of FIG. 1. First, the phase plate 44 is moved out of the beam path so that the beam spot of the depletion laser has a Gaussian intensity shape and is overlapped with the beam spots of the pump laser as well as the probe laser at the focal plane of the objective lens 42. Then, the frequency of the pump laser is locked to the absorption line of the Rubidium (Rb) gas. Next, the frequency of the probe laser is scanned until the detector detects the stimulated Brillouin gain (SBG) signal. Next, the pump laser beam is blocked, and the frequency of the depletion laser is scanned until the detector detects the stimulated Brillouin loss (SBL) signal. Next, the pump laser beam is re-switched on, and the power of the depletion laser is adjusted until the SBG signal and SBL signal cancel out with each other. In the end, the phase plate 44 is inserted into the beam path to reshape the beam spot of the depletion laser into a donut shape at the focal plane of the objective lens 42.

Figure 3:
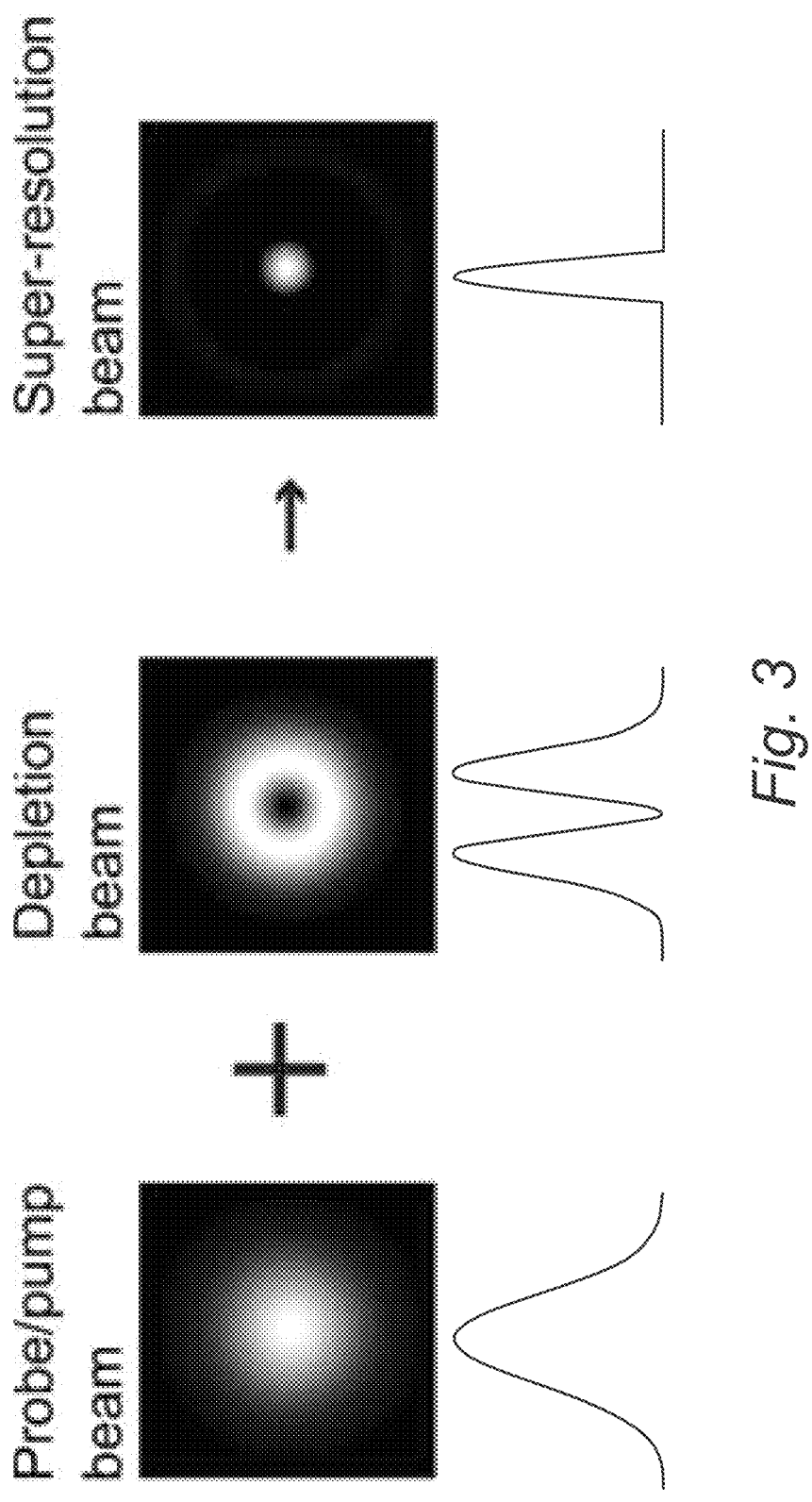
FIG. 3 shows the examples on simulation result of the beam shape manipulation for achieving super-resolution. The top panel shows the beam shape, and the bottom panel shows the intensity profile.

FIG. 3 shows the examples on simulation results of the beam shape manipulation for achieving super-resolution. The probe and pump lasers have a Gaussian intensity profile (as shown in the lower panel) at the focal plane of the objective lenses 36 and 42, respectively. With the phase plate 44, the depletion laser has a donut intensity profile and is overlapped with the diffraction-limited Gaussian beam at the same focal plane within the sample. Within the overlapping region, the SBG signal is depleted by the depletion laser. Therefore, the detected SBG signal will be only from the subtracted region. Since the spot size of the subtracted region is much smaller than the Gaussian beam, super-resolution that breaks the diffraction limit is achieved.

Figure 4:
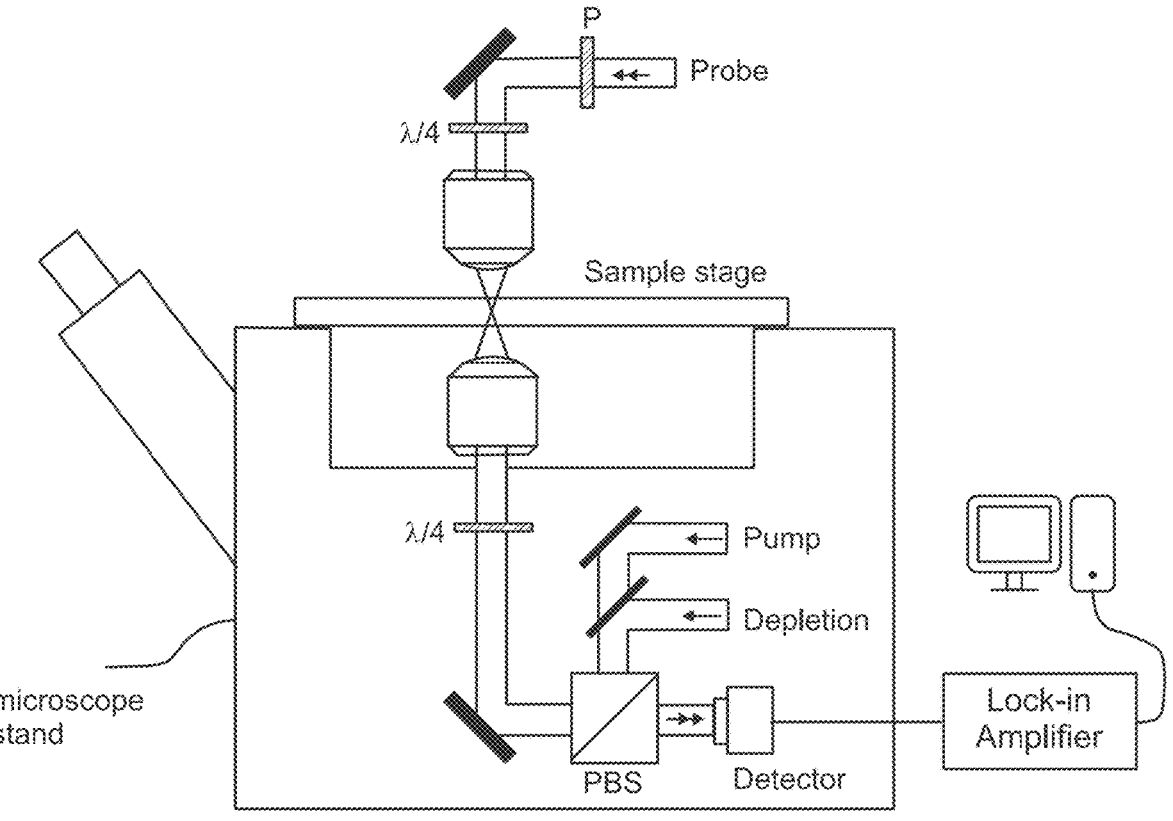
FIG. 4 shows an exemplary setup developed based on the content of this invention for super-resolution Brillouin measurement. P: polarizer; $\lambda/4$: quarter-wave plate; PBS: polarized beam splitter.

FIG. 4 shows an exemplary setup developed based on the content of this invention for super-resolution Brillouin measurement. The setup is built using an inverted microscope stand. To establish stimulated Brillouin scattering, the pump laser beam and probe laser beam are counterpropagating and coincided within the sample by using two identical objective lenses. This creates a diffraction-limited Gaussian beam spot at the focal plane. To achieve super-resolution, a third laser (the depletion laser with a donut beam shape) is coupled into the setup and overlapped with the Gaussian beam spot within the sample. By tuning the frequency of the depletion laser, Brillouin signal of the overlapped region of the Gaussian and donut beams will be selected depleted. As a result, the detector will only receive Brillouin signal from the subtracted region, whose size is much smaller than the initial Gaussian beam thus breaks the diffraction limit. A lock-in amplifier is used for high-sensitivity detection of the Brillouin signal, and a computer is used for signal collection.

Figure 5:
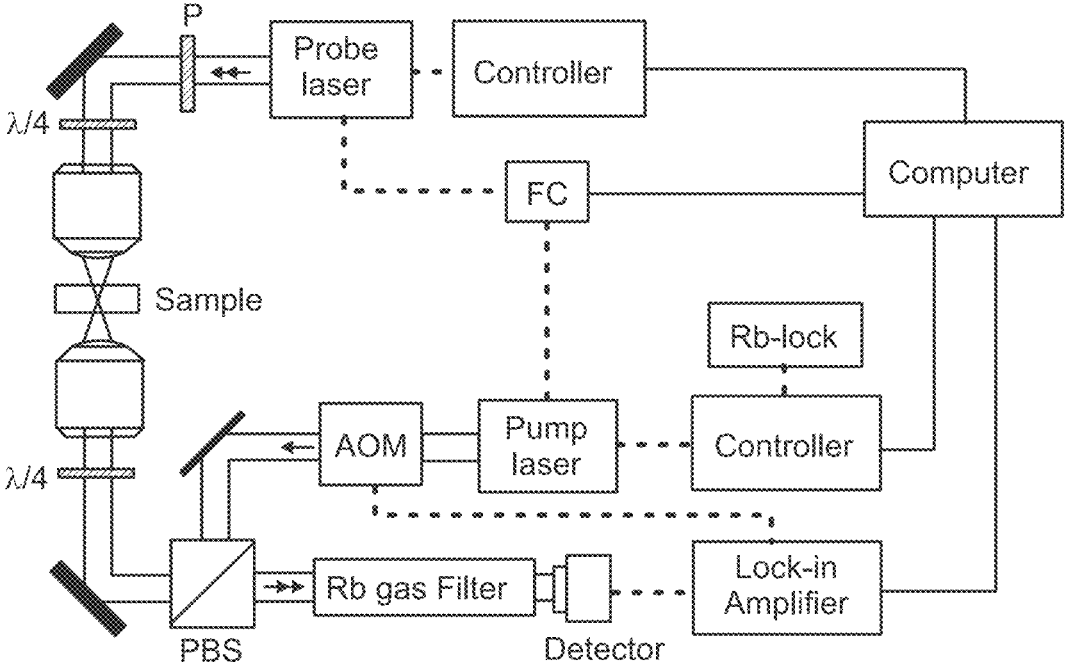
FIG. 5 shows an exemplary setup developed based on the content of this invention for establishing stimulated Brillouin scattering. FC: frequency counter; Rb: rubidium. The rest notations are the same as that in FIG. 4.

FIG. 5 shows an exemplary setup developed based on the content of this invention for establishing stimulated Brillouin scattering. The pump laser (780.24 nm, TA pro, Toptica) is locked to the absorption line of the Rb gas cell (COSY, Toptica). The probe laser (780.24 nm, DL pro, Toptica) is freely running, and its frequency difference against the pump laser is monitored by the frequency counter (FC) in real time. Two identical objective lenses (60×, NA=1.2, Olympus) are used to focus the laser beams into a Gaussian shape and overlapping each other within the sample. The pump laser is further modulated by a AOM with a frequency of ~1 MHz for high-sensitivity signal detection. To reject the stray light noise, a Rb gas cell (300-mm length) is placed in front of the photodiode detector. By scanning the frequency of the probe laser, the SBG signal is detected by the lock-in amplifier. A software interface based on LabVIEW platform is developed to control the lasers, monitor the status of the components, and detect the signal. We first quantify the dependence of the signal-to-noise ratio (SNR) on the power delivered to the sample by the pump and probe lasers. From there, we determine the optimized parameters that allows us to conduct experiments with lowest light dose.

Figure 6:
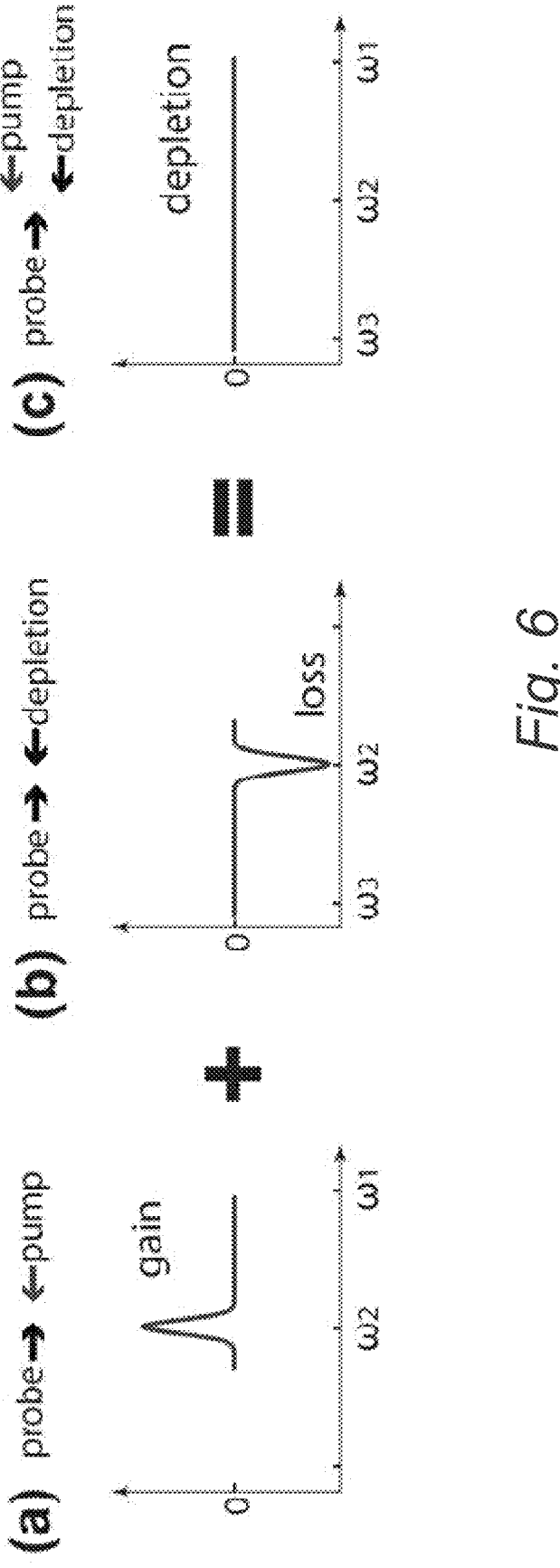
FIG. 6 shows an exemplary setup developed based on the content of this invention for achieving stimulated emission depletion within the overlapping region of the Gaussian beam and donut beam. (a) Brillouin gain by probe ($\omega_2$) and pump ($\omega_1$) lasers; (b) Brillouin lose by probe and depletion ($\omega_3$) lasers; (c) Brillouin signal depleted by pump, probe, and depletion lasers.

FIG. 6 shows an exemplary setup developed based on the content of this invention for achieving stimulated emission depletion within the overlapping region of the Gaussian beam and donut beam. Briefly, it includes three steps. Step 1 (FIG. 6a): lock the pump laser ($\omega_1$) to Rb gas cell, scan the probe laser ($\omega_2$) at 1 kHz until obtaining SBG signal. At the end of this step, we will record the Brillouin shift of the sample: $\omega_B=\omega_1-\omega_2$. Step 2 (FIG. 6b): switch off the pump beam, and switch on the depletion beam; set the initial frequency of the depletion laser $\omega_3=\omega_1-2\omega_B$, then slowly scan (1 Hz) its frequency within a bandwidth of ±1 GHz until acquiring SBL signal; stop scanning the depletion laser. Step 3 (FIG. 6c): switch on the pump beam, adjust the power of the depletion laser until the SBG signal and SBL signal cancel each other out. At the end of this step, the depletion condition will be successfully achieved. Motorized optical shutter is used to control on/off status of each laser beam. The frequency scan of the lasers is driven by the function generator and coordinated with each other.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCES

1. Fletcher D A, Mullins R D. Cell mechanics and the cytoskeleton. *Nature.* 2010; 463(7280):485-492.
2. Kirby T J, Lammerding J. Emerging views of the nucleus as a cellular mechanosensor. *Nature Cell Biology.* 2018:1.
3. Kumar S, Maxwell I Z, Heisterkamp A, et al. Viscoelastic retraction of single living stress fibers and its impact on cell shape, cytoskeletal organization, and extracellular matrix mechanics. *Biophysical journal.* 2006; 90(10): 3762-3773.
4. Rotsch C, Radmacher M. Drug-induced changes of cytoskeletal structure and mechanics in fibroblasts: an atomic force microscopy study. *Biophysical journal.* 2000; 78(1): 520-535.
5. Lu L, Oswald S J, Ngu H, Yin F C-P. Mechanical properties of actin stress fibers in living cells. *Biophysical journal.* 2008; 95(12):6060-6071.
6. Kassianidou E, Kumar S. A biomechanical perspective on stress fiber structure and function. *Biochimica et Biophysica Acta (BBA)—Molecular Cell Research.* 2015; 1853(11):3065-3074.
7. Kennedy B F, Wijesinghe P, Sampson D D. The emergence of optical elastography in biomedicine. *Nature Photonics.* 2017; 11(4):215-221.
8. Zhang J, Scarcelli G. Mapping mechanical properties of biological materials via an add-on Brillouin module to confocal microscopes. *Nature protocols.* 2021; 16(2): 1251-1275.
9. Scarcelli G, Yun S H. Confocal Brillouin microscopy for three-dimensional mechanical imaging. *Nature photonics.* 2008; 2(1):39-43.
10. Scarcelli G, Polacheck W J, Nia H T, et al. Noncontact three-dimensional mapping of intracellular hydro-mechanical properties by Brillouin microscopy. *Nature methods.* Oct. 5, 2015; 12(12):1132-1134. doi:10.1038/nmeth.3616
11. Zhang J, Alisafaei F, Nikolić M, et al. Nuclear Mechanics within Intact Cells Is Regulated by Cytoskeletal Network and Internal Nanostructures. *Small.* 2020; 16:1907688.
12. Roberts A B, Zhang J, Singh V R, et al. Tumor cell nuclei soften during transendothelial migration. *Journal of Biomechanics.* 2021; 121:110400.

13. Nikolić M, Scarcelli G. Long-term Brillouin imaging of live cells with reduced absorption-mediated damage at 660 nm wavelength. *Biomedical Optics Express.* 2019; 10(4):1567-1580.
14. Prevedel R, Diz-Muñoz A, Ruocco G, Antonacci G. Brillouin microscopy: an emerging tool for mechanobiology. *Nature methods.* 2019; 16(10):969-977.
15. Eltony A M, Shao P, Yun S-H. Measuring mechanical anisotropy of the cornea with Brillouin microscopy. *arXiv preprint arXiv:*200304344. 2020;
16. Antonacci G, Beck T, Bilenca A, et al. Recent progress and current opinions in Brillouin microscopy for life science applications. *Biophysical Reviews.* 2020; 12:615-624.
17. Bevilacqua C, Sánchez-Iranzo H, Richter D, Diz-Muñoz A, Prevedel R. Imaging mechanical properties of submicron ECM in live zebrafish using Brillouin microscopy. *Biomedical Optics Express.* 2019; 10(3):1420-1431.
18. Shao P, Eltony A M, Seiler T G, et al. Spatially-resolved Brillouin spectroscopy reveals biomechanical abnormalities in mild to advanced keratoconus in vivo. *Scientific reports.* 2019; 9(1):1-12.
19. Palombo F, Fioretto D. Brillouin light scattering: applications in biomedical sciences. *Chemical reviews.* 2019; 119(13):7833-7847.
20. Schlüßller R, Möllmert S, Abuhattum S, et al. Mechanical mapping of spinal cord growth and repair in living zebrafish larvae by brillouin imaging. *Biophysical journal.* 2018; 115(5):911-923.
21. Yun S H, Chernyak D. Brillouin microscopy: assessing ocular tissue biomechanics. *Current opinion in ophthalmology.* 2018; 29(4):299.
22. Raghunathan R, Zhang J, Wu C, et al. Evaluating biomechanical properties of murine embryos using Brillouin microscopy and optical coherence tomography. *Journal of Biomedical Optics.* 2017; 22(8):086013.
23. Zhang J, Raghunathan R, Rippy J, et al. Tissue biomechanics during cranial neural tube closure measured by Brillouin microscopy and optical coherence tomography. *Birth defects research.* 2018; 111:991-998.
24. Zhang J, Fiore A, Yun S-H, Kim H, Scarcelli G. Line-scanning Brillouin microscopy for rapid non-invasive mechanical imaging. *Scientific reports.* 2016; 6:35398.
25. Boyd R W. *Nonlinear optics.* Academic press; 2003.
26. Remer I, Shaashoua R, Shemesh N, Ben-Zvi A, Bilenca A. High-sensitivity and high-specificity biomechanical imaging by stimulated Brillouin scattering microscopy. *Nature Methods.* 2020; 17(9):913-916.
27. Hell S W, Wichmann J. Breaking the diffraction resolution limit by stimulated emission: stimulated-emission-depletion fluorescence microscopy. *Optics letters.* 1994; 19(11):780-782.

What is claimed is:

1. An apparatus for super-resolution Brillouin microscopy comprising a probe laser that emits a first laser beam;

a first optical system that focuses the first laser beam into a first Gaussian-shaped beam spot on a sample at a first focal plane that has a first Gaussian intensity profile;

a pump laser that emits a second laser beam a second optical system that focuses the second laser beam into a second Gaussian-shaped beam spot on the sample at a second focal plane that has a second Gaussian intensity profile, the first Gaussian-shaped beam spot overlapping the second Gaussian-shaped beam spot at the same focal plane;

a depletion laser that emits a third laser beam;

a third optical system that focuses the third laser beam into a third beam spot having a donut shape with zero intensity in its center, the third beam spot being overlaid with the first Gaussian-shaped beam spot and the second Gaussian-shaped beam spot; and a detector configured to detect a stimulated Brillouin gain (SBG) signal and a stimulated Brillouin loss (SBL) signal, wherein the apparatus is configured to adjust frequencies of the probe laser, the pump laser, and the depletion laser to establish stimulated emission depletion such that a Brillouin signal created from a subtracted region of the first Gaussian-shaped beam spot and the second Gaussian-shaped beam spot and donut beam is collected and redirected into the detector.

2. The apparatus of claim 1, wherein the first optical system includes:

a polarizer through which the first laser beam passes;

a first quarter-wave plate through which the first laser beam passes after the polarizer; and a first objective lens that focuses the first laser beam onto the sample, wherein the first laser beam has a beam spot with a diffraction-limited Gaussian intensity profile.

3. The apparatus of claim 2, wherein the first laser beam is reflected by a mirror from the polarizer to the first quarter-wave plate.

4. The apparatus of claim 2, wherein the second optical system includes:

a second quarter-wave plate that receives the second laser beam; and a second objective lens that focuses the second laser beam onto the sample.

5. The apparatus of claim 4, wherein the second laser beam emitted from the pump laser is redirected into the second quarter-wave plate by a beam splitter, a polarized beam splitter, and a mirror.

6. The apparatus of claim 4, wherein the third optical system includes:

a phase plate through which the third laser beam passes to modify its wavefront phase such that the third laser beam has the donut shape; and the second objective lens that also focuses the third laser beam onto the sample.

7. The apparatus of claim 6, wherein the third laser beam is guided from the phase plate into the second objective lens and focused into the sample after passing through a first mirror, a beam splitter, a polarized beam splitter, a second mirror, and the second quarter-wave plate.

8. The apparatus of claim 6, wherein the first objective lens and the second objective lens has the same construction.

9. An apparatus for super-resolution Brillouin microscopy comprising a probe laser that emits a first laser beam;

a polarizer through which the first laser beam passes;

a first quarter-wave plate through which the first laser beam passes after the polarizer;

a first objective lens that focuses the first laser beam onto a sample, wherein the first laser beam has a beam spot with a diffraction-limited Gaussian intensity profile;

a pump laser that emits a second laser beam;

a second quarter-wave plate that receives the second laser beam;

a depletion laser that emits a third laser beam;

a phase plate through which the third laser beam passes to modify its wavefront phase such that the third laser beam has a donut shape;

a second objective lens that focuses the second laser beam and the third laser beam onto the sample, wherein a beam spot from the third laser beam is overlaid with Gaussian-shape beam spots of the first laser beam and the second laser beam; and a detector configured to detect a stimulated Brillouin gain (SBG) signal and a stimulated Brillouin loss (SBL) signal, wherein the apparatus is configured to adjust frequencies of the probe laser, the pump laser, and the depletion laser to establish stimulated emission depletion such that a Brillouin signal created from a subtracted region of the Gaussian-shape beam spots and donut beam is collected by the second objective lens and redirected into the detector.

10. The apparatus of claim 9, wherein the first laser beam is reflected by a mirror from the polarizer to the first quarter-wave plate.

11. The apparatus of claim 9, wherein the second laser beam emitted from the pump laser is redirected into the second quarter-wave plate by a beam splitter, a polarized beam splitter, and a mirror.

12. The apparatus of claim 9, wherein the third laser beam is guided from the phase plate into the second objective lens and focused into the sample after passing through a first mirror, a beam splitter, a polarized beam splitter, a second mirror, and the second quarter-wave plate.

13. The apparatus of claim 9, wherein the first objective lens and the second objective lens are adjusted such that their focal planes are overlapped within the sample.

14. The apparatus of claim 13, wherein beam spots of the first laser beam and the second laser beam are perfectly overlapped within the sample and have Gaussian intensity profile.

15. A method for establishing stimulated emission depletion with the apparatus of claim 9, the method comprising:

moving the phase plate out of a beam path so that the beam spot of the depletion laser has a Gaussian intensity shape and is overlapped with beam spots of the pump laser as well as the probe laser at a focal plane of the first objective lens and/or second objective lens;

locking the frequency of the pump laser to an absorption line of rubidium (Rb) gas; scanning the frequency of the probe laser until the detector detects the stimulated Brillouin gain (SBG) signal;

blocking the second laser beam, and scanning the frequency of the depletion laser until the detector detects the stimulated Brillouin loss (SBL) signal;

re-switching on the second laser beam, and adjusting the power of the depletion laser until the SBG signal and SBL signal cancel out with each other; and inserting the phase plate into the beam path to reshape the beam spot of the depletion laser into the donut shape at the focal plane of the first objective lens and/or second objective lens.

* * * * *